United States Patent [19]

Varacca

[11] Patent Number: 5,092,177
[45] Date of Patent: Mar. 3, 1992

[54] DEVICE FOR MEASURING THE DEFORMATIONS OF A DIAPHRAGM

[75] Inventor: Henri Varacca, Montelier, France
[73] Assignee: Sextant Avionique, France
[21] Appl. No.: 557,815
[22] Filed: Jul. 26, 1990

[30] Foreign Application Priority Data

Jul. 27, 1989 [FR] France ................. 89 10387

[51] Int. Cl.⁵ .................. G01L 9/06; G01L 19/04
[52] U.S. Cl. ........................ 73/708; 73/721; 73/727; 338/4
[58] Field of Search .......... 73/708, 721, 727, DIG. 4; 338/4

[56] References Cited

U.S. PATENT DOCUMENTS

| | | | |
|---|---|---|---|
| 2,580,407 | 1/1952 | Clark | 73/726 |
| 3,341,794 | 9/1967 | Stedman | 73/720 |
| 3,455,165 | 7/1969 | Huet | 73/727 |
| 4,116,075 | 9/1978 | Ort | 73/708 |
| 4,140,023 | 2/1979 | Edwards et al. | 73/721 |
| 4,311,980 | 1/1982 | Prudenziati | 338/4 |
| 4,376,929 | 3/1983 | Myhre | 338/4 |

*Primary Examiner*—Donald O. Woodiel
*Attorney, Agent, or Firm*—Lowe, Price, LeBlanc and Becker

[57] ABSTRACT

A device for measuring the deformations of a flexible diaphragm (1) sealed by its periphery to a support (2) and wherein are formed four sensors constituted by a thick layer of piezo-resistive material and connected as a Wheatstone bridge. The sensors are arranged on both sides of the diaphragm with, on each surface, a sensor (R3, R4) at the neighborhood of the center and a sensor (R1, R2) at the neighborhood of the periphery. A central sensor and a peripheral sensor of the opposite surface are arranged in opposite legs of the bridge, two sensors of the same surface having their connection point connected to a supply terminal of the bridge. The device serves as a pressure sensor.

3 Claims, 1 Drawing Sheet

DEVICE FOR MEASURING THE DEFORMATIONS OF A DIAPHRAGM

BACKGROUND OF THE INVENTION

The present invention relates to a device for measuring the deformations of a diaphragm, those deformations resulting from a physical phenomenon such as a pressure variation on both sides of this diaphragm or an acceleration.

The invention more particularly relates to such measuring devices wherein the detection of deformations is ensured by piezo-resistive sensors constituted by a thick layer (having a thickness of about 10 micrometers) of a piezo-resistive material, for example through silk screening or ink jet.

The state of the art in this field will be reminded in relation with FIGS. 1A-1D.

A conventional diaphragm sensor comprises a flexible diaphragm 1 embedded on its circular periphery in a support 2. This diaphragm is, for example, made in $Al_2O_3$ ceramics, as well as its support. Devices of this type are generally used to measure pressures for detecting possible pressure differences on both sides of the diaphragm.

Due to pressure, the diaphragm is deformed and the piezo-resistive sensors (single or double) are arranged on the diaphragm for measuring the deformations thereof.

According to a conventional implementation, four sensors are provided for; two, r1 and r3, being arranged at the periphery and the other two, r2 and r4, being arranged close to the middle of the diaphragm. Those four sensors are on the same diaphragm surface because it is generally considered that this simplifies manufacturing and permits to better adjust the four sensors to same values especially due to the fact that they will result exactly from the same deposition and same manufacturing process.

A top view shows such an exemplary sensor in FIG. 1C. A thick layer of piezo-resistive substance 4 is arranged between two previously deposited metallizations 5 and 6. The size of a sensor is about one millimeter. This is an example of a particularly simple sensor but those skilled in the art will be able to use various types of more sophisticated sensors.

Sensors are generally mounted in a Wheatstone bridge as illustrated in FIG. 1D. The two sensors r1 and r3 arranged at the diaphragm periphery are facing each other in the bridge as well as the two sensors placed in the centre. Thus, at rest, since the four sensors r1–r4 have the same resistance r0, a voltmeter V arranged in a diagonal of the bridge, the other diagonal of which is fed by a voltage E, will see a null voltage.

During deformation, the resistances of r1 and r3 will vary in a first direction and the resistances of sensors r2 and r4 will vary in opposite direction. If $\Delta r$ designates the resistance variation of a sensor, the detected voltage V will be:

$$V = VO + EO\,[\Delta r2 - \Delta r1 + \Delta r4 - \Delta r3]/4r0, \qquad (1)$$

VO being an error voltage, normally constant, that can be rendered very low by adjusting the sensor size of the piezo-resistive layer portions and/or by providing externally adjustable resistors that may be formed at the diaphragm periphery at positions not submitted to stresses and accessible once the diaphragm has been fixed on its support.

Thus, at first sight, such a structure gives a satisfactory result.

To obtain pressure measurements independent of temperature variations, a reference temperature is chosen for carrying out measurements. However, a hysteresis phenomenon associated with thermal variations occurs. During thermal cycles, residual stresses appear on resistances, those stresses being different according as this reference temperature is reached from a high temperature value or from a low temperature value. Moreover, this hysteresis will not be the same for peripheral sensors as for central sensors. This is due to the fact, known per se, that for peripheral sensors and central sensors, the ratio between the transversal sensibility and the longitudinal sensibility is not the same. Thus, considering again the above equation (1), in addition to resistance variations associated with deformations, there will be an additional resistance variation associated with the thermal history of the sensor. This difference will not be eliminated due to the fact it has the same sign for sensors r2 and r4 centrally arranged, on the one hand, and for sensors r1 and r3 arranged at the periphery, on the other hand. This hysteresis is no longer acceptable when it is desired to reach an accuracy better than 1%.

To palliate this drawback, various approaches have been devised in the prior art, especially as regards the shape of the sensors, the material of the thick piezo-resistive layer and the deposition and curing processes. However, those approaches have not proven satisfactory.

The object of the invention is to eliminate the errors due to this thermal hysteresis effect.

SUMMARY OF THE INVENTION

To achieve this object, the invention provides for a device for measuring the deformations of a flexible diaphragm, sealed by its periphery to a support and wherein are formed four sensors constituted by a thick layer of piezo-resistive material and connected as a Wheatstone bridge; the sensors are arranged on both sides of the diaphragm with, on each surface, a sensor at the neighbourhood of the centre and a sensor at the neighbourhood of the periphery; a central sensor and a periphery sensor of the opposite surface are connected in the opposite bridge legs, two sensors of the same surface having their connection point connected to a supply terminal of the bridge.

In an embodiment of the invention, the support constitutes a chamber connected to a pneumatic circuit, whereby the diaphragm moves as a function of pressure variations on its two surfaces and whereby the device constitutes a pressure sensor.

BRIEF DISCLOSURE OF THE DRAWINGS

The foregoing and other objects, features and advantages of the invention will be apparent from the following detailed description of a preferred embodiment as illustrated in the accompanying drawings wherein:

FIGS. 1A-1D, designed to illustrate the state of the art, have been described above;

FIGS. 2A and 2B show a schematic section view and a schematic top view, respectively, of a diaphragm provided with piezo-resistive sensors according to the invention; and FIG. 2C shows a bridge circuit of the sensors used according to the invention.

DESCRIPTION OF A PREFERRED EMBODIMENT

Figure 1A:
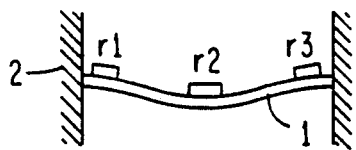
Figure 1B:
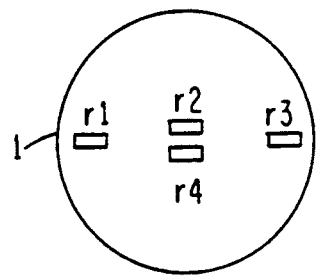
Figure 1C:
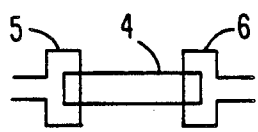
Figure 1D:
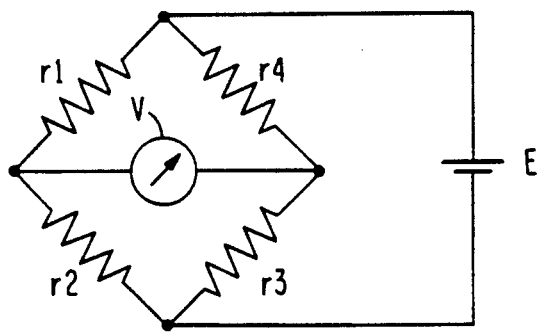
Figure 2A:
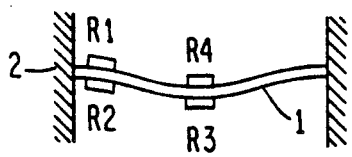
Figure 2B:
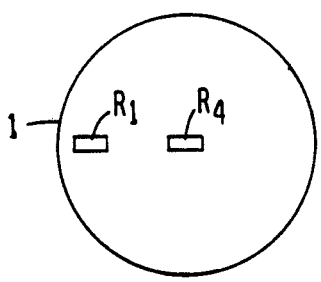
Figure 2C:
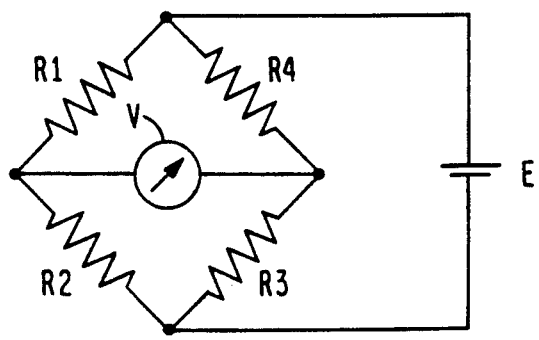

According to the invention, as in the prior art, a flexible diaphragm 1 is sealed to a peripheral support 2. However, all sensors are no longer arranged on the same surface of the diaphragm but are arranged on both sides of the latter. Thus, on the upper surface of the diaphragm, there are a peripheral sensor R1 and a central sensor R4 and, on the lower surface of the diaphragm, there are a peripheral sensor R2 and a central sensor R3. Those sensors are bridge-connected as illustrated in FIG. 2C, that is, the peripheral sensor of a surface (R1 or R2) is arranged in the opposite leg of the bridge with respect to the central sensor of the opposite sensor (R3 or R4).

It will be noted that, according to the invention, due to the opposite arrangement of the sensors, their features which result from distinct depositions may present slight differences but sensors of a same surface will exhibit the same features. Therefore, it is possible, with conventional adjustment methods such as those used in the prior art, to have, at rest, R1=R4 and R2=R3 with the same piezo-resistive and thermal characteristics as for the sensors arranged on a same surface. Therefore, in the absence of stresses, a balanced bridge is achieved since the product R1.R3=R2.R4. But, considering equation (1) again, it can be seen that, if there remains residual stresses due to the thermal history of the device, their effects will be identical for the central sensors, on the one hand, and for the lateral sensors, on the other hand, and will be cancelled.

The arrangement according to the invention has been tested under actual conditions and it has proven to give the expected results, even if the device is arranged so that, under the maximum stress to be measured, the displacement of the diaphragm is not negligible with respect to its thickness.

Although the invention has been described above essentially in connection with a pressure sensor, it will be noted that a flexible diaphragm according to the invention is liable of other applications and may, for example, be used for measuring accelerations.

The invention is liable of various variants and modifications that will appear to those skilled in the art who will especially be able to select the shape of the sensors and the material of the thick piezo-resistive layer. Moreover, the invention is not limited to the represented embodiment wherein the sensors of the two surfaces of the diaphragm are mutually opposite. Those skilled in the art will be able to freely choose the arrangement of those sensors provided there are on each surface a substantially central sensor and a substantially peripheral sensor. It will also be possible to arrange on the diaphragm additional sensors designed for example to measure temperature.

I claim:

1. A device for measuring the deformations of a flexible diaphragm sealed by its periphery to a support and wherein are formed four sensors constituted by a thick layer of piezo-resistive material and connected as a Wheatstone bridge, wherein:

the sensors are arranged on both sides of the diaphragm with first and second sensors on opposite sides and generally at the center of said diaphragm, and third and fourth sensors on opposite sides and generally at the periphery of said diaphragm; and each said sensor generally at the center and each said sensor generally at the periphery on opposite sides are connected in opposite legs of the bridge, two sensors of the same side having their connection point connected to a supply terminal of the bridge.

2. A device for measuring the deformations of a diaphragm according to claim 1, wherein said sensors and said support are made of ceramics.

3. A device for measuring the deformations of a diaphragm according to claim 1, wherein said support constitutes a chamber connected to a pneumatic circuit, whereby the diaphragm moves as a function of the pressure variations on its two surfaces and said device constitutes a pressure sensor.

* * * * *